United States Patent [19]
Cheng et al.

[11] Patent Number: 5,315,020
[45] Date of Patent: May 24, 1994

[54] METHOD OF RECOVERING WASTE HEAT FROM EDIBLE OIL DEODORIZER AND IMPROVING PRODUCT STABILITY

[75] Inventors: Alan T. Y. Cheng, Livingston, N.J.; Jose R. Calvo; Ramon R. Barrado, both of Madrid, Spain

[73] Assignee: Praxair Technology, Inc., Danbury, Conn.

[21] Appl. No.: 921,146

[22] Filed: Jul. 29, 1992

[51] Int. Cl.$^5$ ............................................. C11B 11/00
[52] U.S. Cl. .................................. 554/184; 554/205; 554/175
[58] Field of Search ................. 554/184, 205

[56] References Cited

U.S. PATENT DOCUMENTS

| | | | |
|---|---|---|---|
| 1,622,126 | 3/1927 | Wecker | 554/205 |
| 3,607,670 | 9/1971 | King | 554/205 |
| 4,009,230 | 2/1977 | Smorenburg | 261/148 |
| 4,378,317 | 3/1983 | Seguine | 554/205 |
| 5,091,116 | 3/1991 | Krishnamurthy et al. | 554/194 |

FOREIGN PATENT DOCUMENTS

| | | |
|---|---|---|
| 0041746 | 12/1981 | European Pat. Off. |
| 195195 | 11/1982 | Japan |
| 0902284 | 6/1989 | Spain |

OTHER PUBLICATIONS

*Refining of Oils and Fats for Edible Purposes*, 2nd Ed., A. J. C. Andersen, Pergamon Press, The Macmillan Company, New York, 1962, pp. 158–169.
*Handbook of Soy Oil Precessing and Utilization*, Erickson et al, Published by American Soybean Association and American Oil Chemist's Society, 1987, pp. 158–159.
Chemical Abstract, vol. 109, No. 21, Ab. No. 189120X, Marschner et al, "Simultaneous Deodorization of and Cholesterol Removal From Fats and Oils by Steam Stripping", 1988.
Chemical Abstract, vol. 85, No. 22, Ab. No. 162303h, Lozheshnik, "Preparing Fat for Hydrogenating by Deodorizing in a medium of a Circulating Inert Gas or Vapor under a Vacuum", 1976.
Chemical Abstract, vol. 103, No. 2, Ab. No. 11225y, "Counter-Current Stripping for Perfumes using Nitrogen Gas", 1977.
JAOCS, "Deodorization and Finished Oil Handling," Arnord M. Gavin, Mar. 1981, pp. 175–184.
U.S. Patent Application S.N. 698,803 filed on May 13, 1991, Alan T. Y. Cheng et al.

*Primary Examiner*—José G. Dees
*Assistant Examiner*—Dwayne C. Jones
*Attorney, Agent, or Firm*—Chung K. Pak

[57] ABSTRACT

The invention relates to a process for recovering heat from deodorized edible oils and stabilizing the same comprising: introducing or injecting non-condensible inert gas into hot deodorized edible oil as the hot deodorized edible oil is cooled by indirectly heat exchanging with crude oil to be deodorized.

10 Claims, 2 Drawing Sheets

METHOD OF RECOVERING WASTE HEAT FROM EDIBLE OIL DEODORIZER AND IMPROVING PRODUCT STABILITY

FIELD OF THE INVENTION

The invention relates to a process for enhancing the stability of deodorized edible oils and/or the waste heat recovery from the deodorized edible oils.

BACKGROUND OF THE INVENTION

Deodorized edible oils are commonly prepared by subjecting crude oils initially to chemical or physical refining and then to deodorization. Generally, chemical refining comprises degumming, neutralizing dewaxing, washing and filtrating. Physical refining, on the other hand, comprises degumming, decoloring and filtering. As these refining techniques leave different amounts of impurities in the crude oils, they may affect the subsequent deodorization conditions chosen. When, for example, the amount of impurities remaining in the oil to be deodorized is substantial due to using the physical refining technique, severe deodorization operating conditions may be necessary to obtain edible oils having the desired quality.

Deodorization basically involves the removal of, among other things, impurities that impart disagreeable odor and taste from crude oils. The impurities removed usually include free fatty acids; disagreeable odor and taste causing compounds, such as aldehydes, ketones, alcohols and hydrocarbons; and compounds formed by the heat decomposition of peroxides and pigments. These impurities should be sufficiently removed to impart the desired properties to the edible oils. For example, the fatty acids in the edible oils should be substantially reduced, to about 0.1 to 0.2%, to obtain the edible oil having the desired properties.

The deodorization of the crude oils is normally accomplished at a high temperature condition under high vacuum, in the presence of an inert stripping gas, such as steam or nitrogen. The high temperature condition promotes thermal decomposition of the undesired impurities as the inert stripping gas strips off the undesired impurities from the crude oils. The high vacuum prevents oxidative degradation of the crude oils during the deodorization.

Once the deodorization is completed, the resulting, hot deodorized edible oils are cooled. At a high temperature, the deodorized edible oils are known to be highly susceptible to oxidative degradation. Thus, by cooling, the susceptibility of deodorized edible oils to oxidation is minimized.

The cooling is usually carried out in a heat recovery unit when the hot, deodorized edible oils are provided under vacuum. The heat recovery unit, which may be or may not be an integral part of the deodorizer, is operated to recover the heat from the discharging, hot deodorized edible oils through using the incoming crude oils to be deodorized as an indirect cooling means. By utilizing the crude oils to recover heat, both the hot deodorized edible oils and the crude oils can simultaneously reach the desired temperatures which are suitable for storage and deodorization, respectively. Using a conventional tube and shell heat exchanger for the above purpose, however, is highly undesirable because an external mechanical pump, which is usually needed to overcome a pressure drop in the heat exchanger, may cause air leakage, thus oxidizing the hot deodorized edible oils under vacuum.

To improve the transfer of heat from the hot, deodorized edible oils to the crude oils, the use of mechanical agitators to agitate the hot deodorized edible oils in the heat recovery unit has been proposed. Agitation with the mechanical agitators could cause turbulent mixing of the hot deodorized edible oils, which in turn reduces the thermal boundary layer next to the cooling coil having the crude oils, thus increasing the heat transfer rate. However, the mechanical agitators do not impart sufficient agitation to cause the crude oils and hot deodorized edible oils to reach equilibrium temperature unless the heat recovery unit and its associated equipments can be made significantly large. Moreover, the mechanical agitators are difficult to employ in the heat recovery unit which needs to be sealed sufficiently to prevent oxidation of the hot, deodorized oils therein. Any leakage of air into the internal chamber of the heat recovery unit, as a result of employing the mechanical agitators, can cause severe oxidative degradation of the hot, deodorized edible oils.

To alleviate the problems associated with the mechanical agitators, steam, which is readily available in a deodorization plant, has been used to agitate or turbulently mix the hot, deodorized oils in the heat recovery unit. Injecting steam into the hot, deodorized edible oils, not only causes agitation sufficient to maximize the heat transfer rate, but also produces a positive pressure inside the heat recovery unit, thus reducing the potential for air leakage.

In spite of these advantages, the use of steam in the heat recovery unit is found to be difficult. Cooling the hot, deodorized edible oils, for instance, below 100° C. is undesirable because steam condenses out as water. The presence of water in the cooled deodorized edible oils may promote bacterial growth and may cause, among other things, a cloudy emulsion or the formation of an immiscible layer. Hence, hot deodorized edible oils are usually cooled to above 100° C. in the heat recovery unit and then further cooled to less than 100° C. in a cooler. However, such a cooling technique is uneconomical because it increases the equipment and operating cost, without maximizing the heat recovery.

Also, steam deodorized edible oils cooled in the above manner are found to have higher tendencies to absorb air, i.e., highly susceptible to oxidative degradation.

It is, therefore, desirable to find ways to enhance the stability of the deodorized edible oils, i.e., less susceptible to oxidative degradation, and enhance the heat recovery from the hot, deodorized edible oils.

SUMMARY OF THE INVENTION

According to the present invention, the improvements in the stability of deodorized edible oils and in the heat recovery are attained by a process which comprises sparging non-condensible inert gas into hot deodorized edible oil in a heat recovery unit as said hot deodorized edible oil therein is cooled to less than 100° C. by indirectly heat exchanging with crude oil. The amount of said non-condensible gas sparged should be sufficient to promote uniform cooling and stability of said hot deodorized edible oil. Once the deodorized edible oil is cooled to the desired temperature in the heat recovery unit, it is delivered to a storage container through a downstream conduit. Additional non-condensible inert gas may be sparged into the deodorized oil in the downstream conduit and/or in the storage container, thus dissolving the additional non-condensible inert gas in the deodorized edible oil. Meantime, the crude oil which is preheated by the discharging, hot deodorized oil may be subsequently deodorized in a deodorization tower which uses a stripping gas selected from steam, non-condensible inert gas and mixtures thereof.

As used herein, the term "crude oil" means any oils derived from vegetable and/or animal sources. The term "vegetable" may include, inter alia, olive, palm, coconut, soyabean, groundnut, cottonseed, sunflower, corn, etc. and the mixtures thereof while the term "animal" may include, inter alia, fishes, mammals, reptiles, etc. and the mixtures thereof.

As used herein, the term "deodorized edible oil" means any crude oil which has been deodorized to retain edible qualities.

As used herein, the term "non-condensible inert gas" means any inert gas which does not condense at the room temperature under the atmospheric condition. The non-condensible inert gas may include, inter alia, nitrogen, carbon dioxide, argon, helium, hydrogen and the mixtures thereof.

DETAILED DESCRIPTION OF THE INVENTION

One aspect of the invention lies in the recognition that the injection of non-condensible inert gas, particularly nitrogen, into hot deodorized edible oil, which is being cooled, can improve the stability of the resultant cooled deodorized edible oil. The injected non-condensible inert gas is found to remove the water condensate present in the deodorized edible oil and is found to be dissolved in the deodorized edible oil. The deodorized edible oil, which is saturated or dissolved with the non-condensible inert gas, is found to be less susceptible to oxidative degradation. Another aspect of the invention lies in the recognition that the injection of non-condensible inert gas promotes the maximum recovery of heat from the hot deodorized edible oil and promotes uniform cooling of the hot deodorized oil. The hot deodorized edible oil can be cooled to the desired temperature with the incoming crude oil since water condensate is not formed when the non-condensible inert gas is used.

Figure 1:
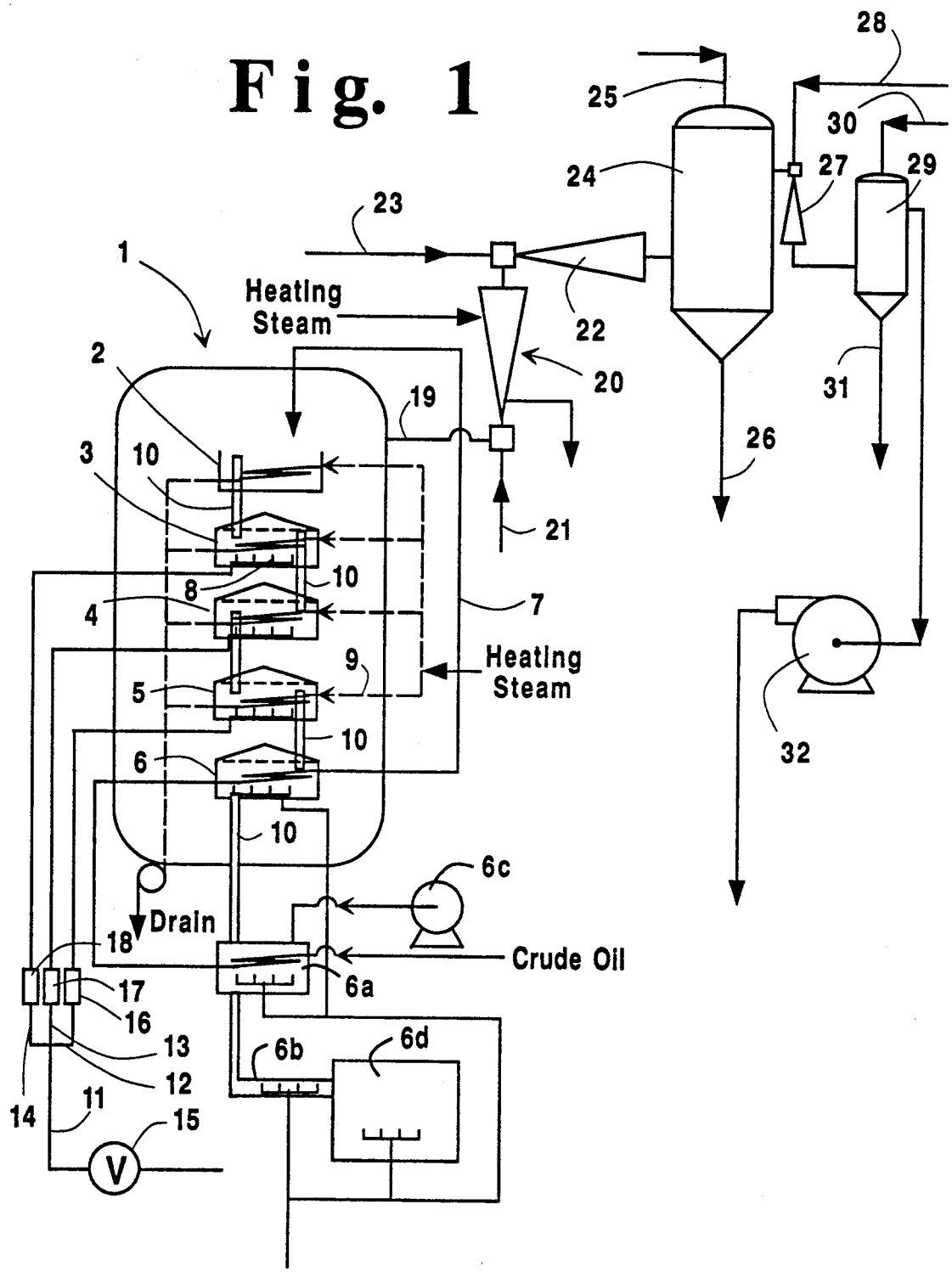
FIG. 1 is a schematic flow chart diagram of a deodorization system which illustrates one embodiment of the present invention.

Now referring to FIG. 1, there is illustrated a schematic deodorization flow chart diagram which represents one embodiment of the present invention. In FIG. 1, crude oil is delivered to the upper portion of a deodorization tower (1) having a plurality of chambers (2, 3, 4, 5 and 6) via a line (7). The crude oil may be preheated by indirectly heat exchanging with the discharging deodorized edible oil product prior to its delivery to the upper portion of the deodorization tower (1). The indirect heat exchange can take place in a heat exchanger which may be one of the chambers, particularly the bottom chamber (6), in the deodorization tower and/or at least one heat exchanger (6a) located inside or outside the deodorization tower. However, the heat exchanger located outside of the deodorization tower, i.e., not an integral part of the deodorization tower, is usually preferred since it can be operated under a variety of different pressures, which may be at least partially created by the gas injected therein. The heat exchangers, herein referred to as a heat recovery unit, may comprise a large tube and shell heat exchanger, with at least one sparger or distributing means located within the shell. The heat recovery unit or heat exchanger may be in communication with a pump (6c) so that the hot deodorized oil can be cooled in the heat exchanger or the heat recovery unit under pressure.

To the hot deodorized edible oil in the heat exchanger or the heat recovery unit, a sufficient amount of non-condensible inert gas is sparged or injected through at least one sparger or distributing means. This amount is equal to at least about 1 scf of non-condensible inert gas per ton of deodorized edible oil, preferably more than 2.2 scf of non-condensible inert gas per ton of deodorized edible oil. The sparged or injected non-condensible inert gas (1) causes agitation or turbulent mixing of the hot deodorized edible oil, (2) removes any moisture present in the hot deodorized edible oil, and (3) causes the deodorized edible oil to be dissolved or saturated with the non-condensible inert gas. The non-condensible inert gas saturated deodorized edible oil is found to be less susceptible to oxidative degradation, particularly when it is free or substantially free of water, while the agitation of the hot, deodorized edible oil during the cooling is found to cause the entire amount of the hot deodorized oil to be uniformly cooled. The maximum heat recovery from the hot deodorized edible oil is also made possible since it can be cooled to less than about 100° C., preferably less than about 60° C., without causing the condensation of non-condensible inert gas. When the non-condensible inert gas is injected or sparged at a velocity of at least about 10 ft/sec, preferably at least 100 ft/sec (such as sonic velocity), the stability of the deodorized edible oil and the heat recovery can be further enhanced due to the increased agitation of the hot deodorized edible oil and the increased saturation of the non-condensible inert gas in the deodorized edible oil. The use of preheated non-condensible inert gas can also increase the non-condensible inert gas saturation level in the deodorized edible oil. Similarly, injecting the non-condensible inert gas into hot deodorized edible oil, as opposed to cooled deodorized edible oil, is found to increase the non-condensible inert gas saturation level in the deodorized edible oil. Upon cooling the hot deodorized edible oil saturated with the non-condensible gas, the deodorized edible oil becomes supersaturated with the non-condensible inert gas.

The resulting deodorized edible oil from the heat exchanger or heat recovery unit may be further heat exchanged with the incoming crude oil which is in the process of being sent to the heat exchanger (6 or 6a) or may be delivered to a storage container (6c) through a downstream pipe (6b). At least one sparger may be provided along the downstream pipe and/or in the storage container to dissolve additional non-condensible inert gas in the deodorized edible oil. The stability of the deodorized edible oil can be further enhanced by further saturating the oil with the non-condensible inert gas. Any excess non-condensible inert gas dissolved or saturated in the deodorized oil eventually evolves from the deodorized edible oil during storage and blankets the deodorized edible oil to provide an additional protection from oxidative degradation.

Usually, the crude oil fed to the deodorization tower is chemically or physically refined. Any crude oil including those which have been subject to at least one of degumming, neutralizing, filtrating, dewaxing, decoloring, bleaching, winterizing, hydrogenating, filtering and deaerating or those which have been refined and deodorized but degraded due to the passage of time and/or exposure to oxygen, nevertheless, may be utilized. The level of impurities in the crude oil employed, however, may dictate the operating conditions of the deodorization tower. Severe operating conditions, for example, may be necessary as the impurities level in the crude oil fed to the deodorization tower increases.

Once the crude oil is fed to the upper portion of the deodorization tower, it flows downwardly over a plurality of vertically spaced chambers (2, 3, 4, 5 and 6) in the deodorization tower (1). All or some of the chambers may be equipped with stripping gas introduction means(8) and indirect heating means (9). While the stripping gas introduction means (8), such as sparging or distributing means having particular orifice sizes, are preferably placed in at least one upper, middle and lower chambers (3, 4 and 5), respectively, the indirect heat exchange means (9) may be placed in all the chambers (2, 3, 4 and 5) except for the bottom chamber (6). Both the quantity and the type of indirect heat exchange means and stripping gas introducing means employed, however, may not be critical as long as the feed material in the deodorization tower is subject to a particular amount of a stripping gas at a deodorization temperature of at least about 130° C.

As the crude oil travels from one chamber to another via downcomers (10), a non-condensible stripping inert gas and/or steam stripping gas is introduced to the tower through conduits (11, 12, 13 and 14) and enters the stripping gas introducing means (8) located at the bottom portions of at least one upper chamber (3) at least one middle chamber (4) and at least one lower chamber (5). From the stripping gas introducing means, the non-condensible inert gas and/or steam flows upwardly countercurrent to and in contact with the oil flowing downwardly under a pressure of about 0.1 to about 6 mmHg vacuum and a temperature of about 150° C. to about 270° C. The amount of the non-condensible inert gas or steam entering the tower may be controlled by a valve (15). When the non-condensible inert gas is used in lieu of steam, as a stripping means, substantially less than the theoretically required amount, which is defined in U.S. Pat. No. 5,241,092, incorporated herein, is used. Substantially less than the theoretical amount may be translated into about 22 scf of non-condensible inert gas per ton of edible oil to about 230 scf of non-condensible inert gas per ton of edible oil, preferably about 70 scf of non-condensible inert gas per ton of edible oil to about 170 scf of non-condensible inert gas per ton of edible oil. The amount of the non-condensible inert gas and/or steam entering the tower should be at least the minimum necessary to produce a deodorized edible oil product having the desired characteristics. For instance, the minimum amount of the non-condensible gas may vary depending on the types of edible oil involved as shown in Table A.

TABLE A

Minimum Nitrogen Requirement Determined in Several Types of Edible Oil

| TYPE OF OIL | MINIMUM NITROGEN FLOW RATE |
| --- | --- |
| Olive oil | 96 scf/ton |
| 20% soybean, 80% sunflower | 105 scf/ton |
| Animal tallow | 168 scf/ton |

The minimum amount of the non-condensible gas and/or steam can also vary depending on the deodorization conditions involved.

The use of the minimum amount of the non-condensible inert gas and/or steam is preferred as it represents savings in motive steam consumption and cooling water consumption in deodorization systems.

The minimum amount of the non-condensible inert gas and/or steam entering the tower may be distributed among at least one upper chamber at least one middle chamber and at least one lower chamber located in the upper, middle and lower portions of the tower. The amount of the non-condensible inert gas and/or steam entering at least one upper chamber, at least one middle chamber and at least one lower chamber may be regulated by valves (not shown) or controlled by altering or adjusting the opening sizes of orifices (16, 17 and 18). Preferably, the valves and/or the orifice opening sizes (16, 17 and 18) are adjusted to provide about 33% to about 65% by volume of the non-condensible gas and/or steam entering the tower to at least one upper tray (3), about 25% to about 50% by volume of the non-condensible gas and/or steam entering the tower to at least one middle tray (4), and about 10% to about 33% by volume of the non-condensible gas and/or steam entering the tower to at least one lower tray (5). Other suitable gas distributing means, i.e., feeding the non-condensible gas separately under different pressures, is also viable in distributing or introducing the specified amount of the non-condensible inert gas or steam to the upper, middle and lower trays.

When the non-condensible inert gas is used as a stripping means, the non-condensible inert gas may be preheated prior to its introduction into the edible oil. The primary purpose of increasing the temperature of the non-condensible inert gas is to decrease the sizes of gas bubbles which are formed as a result of introducing or injecting the non-condensible gas into the oil. By reducing the sizes of the gas bubbles, the mass transfer of fatty acid and odoriferous substances to the gas phase is improved due to the increased gas-liquid interfacial area for a given volume of a stripping gas employed. This increased mass transfer rate can be further ameliorated by reducing the opening sizes of orifices for injecting the non-condensible gas and by injecting the non-condensible gas at a sonic velocity. The use of the small orifice openings and sonic velocity may promote the further reduction of gas bubble sizes.

During deodorization, the vapors containing, inter alia, a non-condensible stripping gas, fatty acid and other odoriferous substances are formed. The vapors are withdrawn from the deodorization tower (1) through a conduit (19) which is in communication with a vacuum booster (20) or thermal compressor (not shown). Steam, herein referred to as motive steam, may be supplied to the vacuum booster (20) through a conduit (21) and the vacuum booster (20) delivers the vapors and motive steam into the entrance of another vacuum booster (22), into which motive steam may be delivered by a conduit (23). The vacuum boosters (20 and 22) are well known in the art and usually include a venturi passageway with a steam jet directing motive steam axially in the direction of vapor flow into the restricted portion of the venturi passage. These boosters may be used to provide a high vacuum in the deodorization tower. While a single pair of vacuum boosters (20 and 22) are employed, it will be understood that as many pairs as are necessary may be provided to operate in parallel with the pair (20 and 22) in order to handle or accommodate the large volume of vapors from the deodorization tower. Enlarging the sizes of the boosters (20 and 22) to accommodate the large volume of vapors may also be viable.

The vapors and steam from the vacuum booster (22) may be introduced into a condenser (24) where they are brought into direct contact with a jet of cooling water supplied through a pipe (25). The condenser (24) is preferably a head barometric condenser which is operated at a pressure of about 5 mmHg to about 300 mmHg with a cooling water having a temperature of about 20° C. to about 50° C. The condensate resulting from cooling the vapors in the condenser (24) is recovered from an outlet (26). Any vapors which are not condensed may be withdrawn from the condenser (24) by means of a steam-jet ejector (27) which is supplied with motive steam through conduit (28). The steam-jet ejector is well known in the art and usually include a venturi passageway with a steam jet directing motive steam axially in the direction of vapor flow into the restricted portion of the venturi passage. It may be used to provide a high vacuum pressure condition in the condenser (24). While one steam ejector is illustrated, it will be understood that as many ejectors as are necessary may be provided to handle the large volume of vapors from the deodorization tower. Enlarging the sizes of the ejector to accomodate the large volume of vapors may also be viable.

The uncondensed vapors and steam from the steam-jet ejector may be introduced into a condenser (29) where they are again brought into direct contact with a jet of cooling water supplied through a pipe (30). The condenser (29) is preferably a secondary barometric condenser which is operated at a pressure of about 50 mmHg to about 500 mmHg vacuum with a cooling water having a temperature of about 2° C. to about 50° C. The resulting condensate from the condenser (29) is recovered from an outlet (31) while the uncondensed vapors comprising non-condensible gas are removed to the atmosphere via a vacuum pump (32) steam ejector (not shown) or other mechanical removing means (not shown).

Figure 2:
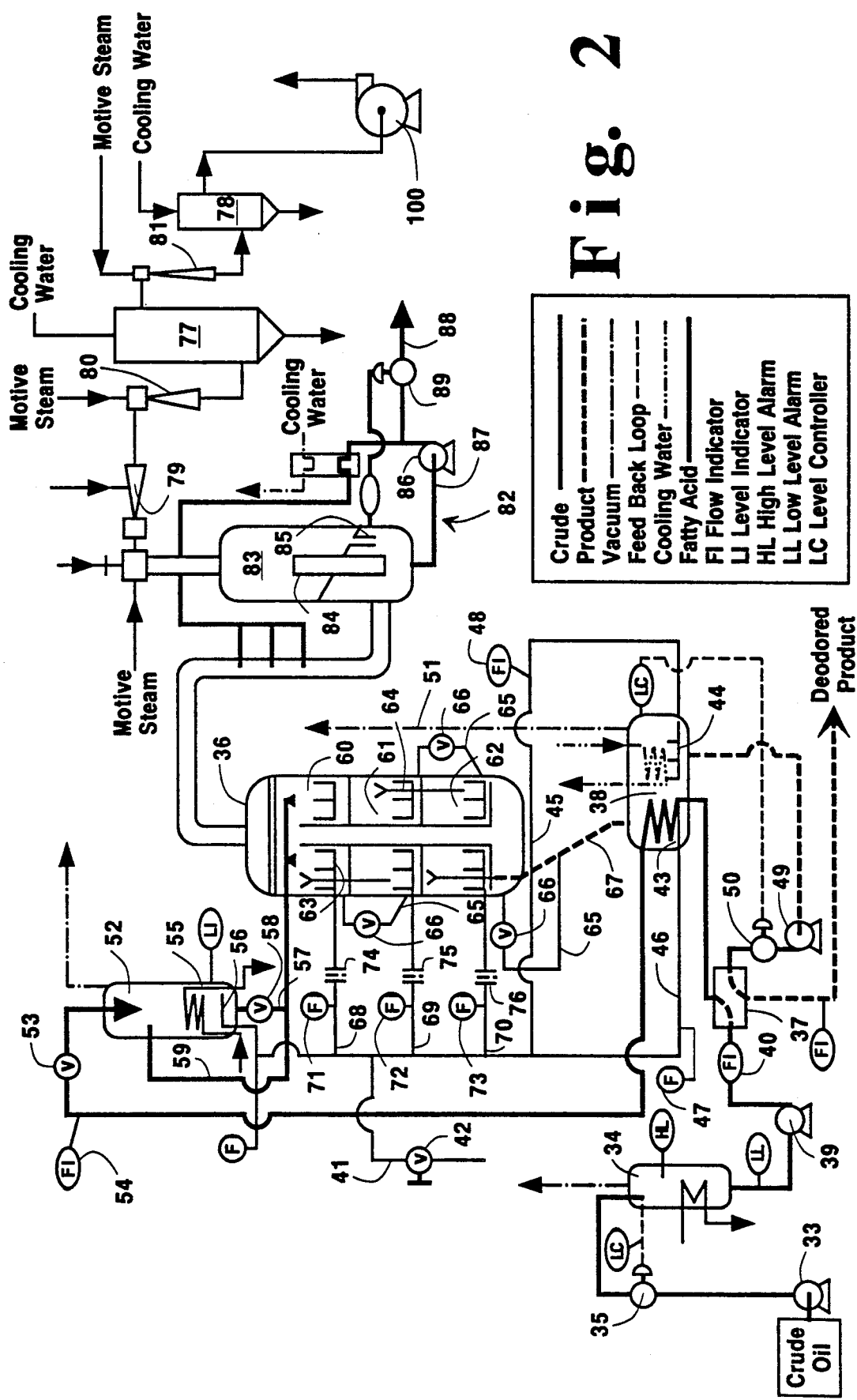
FIG. 2 is another schematic flow chart diagram of a deodorization system which illustrates one embodiment of the present invention.

In reference to FIG. 2, there is illustrated another schematic deodorization flow chart diagram which represents one embodiment of the present invention. In this Figure, the crude oil above is delivered via a pump (33) to a thermal heater (34) which is operated at a temperature of about 25° C. to about 100° C. The amount of the starting material delivered to the thermal heater (34) is controlled by a valve (35) which is generally adjusted based on the level of the starting material in the thermal heater (34). The thermal heater may be equipped with high level and low level alarms to provide output signals to the valve (35), thus regulating the flow of the crude oil entering the heater by adjusting the valve (35) in accordance with the output signals.

The preheated crude oil may be further heated when it is used to cool the hot deodorized edible oil product discharging by gravity from a deodorization tower (36). The preheated crude oil, for example, is delivered to indirect heat exchangers (37) and (38) via a pump (39). The rate at which the crude oil is delivered may be monitored via a flow indicator (40) and may be regulated by the pump (39) to obtain both the crude oil and the deodorized product, which have the desired temperature conditions. To enhance the heat transfer from the deodorized product to the crude oil and to cool the deodorized product uniformly to about 100° C. or less, preferably 60° C. or less, the deodorized product may be fed countercurrently with respect to the direction of the flow of the crude oil in the heat exchanger (37 and 38) and is agitated with a non-condensible inert gas in the presence of additional cooling means in the heat exchanger (38).

The non-condensible inert gas may be preheated prior to its injection into the deodorized product. The primary purpose of increasing the temperature of the non-condensible inert gas is to decrease the sizes of gas bubbles which are formed as a result of injecting or sparging the non-condensible inert gas into the deodorized product. By reducing the sizes of gas bubbles, the amount of the non-condensible inert gas dissolved in the deodorized product can be increased. This increased saturation level of the non-condensible inert gas can be further ameliorated by reducing the sizes of nozzle openings for injecting the non-condensible inert gas and/or by injecting it at sonic velocity. The use of small nozzle openings and/or sonic velocity may promote the further reduction of gas bubble sizes.

This non-condensible inert gas is provided from a conduit (41) having a valve (42) to gas introducing means (43 and 44) through conduits (45 and 46) having flow indicators (47 and 48) respectively. The amount of the deodorized product removed from the heat exchanger (38) is controlled by a pump (49) and/or a valve (50) which is regulated by the level of the deodorized product in the heat exchanger (38). The non-condensible inert gas in the heat exchanger (38) may be withdrawn through a conduit (51) and may be sent to condensers directly or through vacuum boosters.

The preheated crude oil from the heat exchanger (38) is fed into a deaerator (52) to remove air therein. The amount of the starting material fed into the deaerator (52) could be regulated by a valve (53). The use of a flow indicator (54) is helpful in adjusting the flow rate of the starting material, which may impart the desired amount of the starting material in the deaerator (52). The adjustment is generally made based on the desired amount of the starting material to be treated in the deodorization tower (36). The deaerator (52) may be heated at about 100° C. to about 270° C. with a heating element (55) containing a thermal fluid and may be provided with a non-condensible inert gas such as nitrogen, using gas distributing means (56) that communicates with the conduit (41) to maximize the removal of the air entrained in the starting material. The non-condensible inert gas and removed air in the deaerator are continuously withdrawn and sent to condensers (77 and 78) while the deaerated starting material is continuously fed to the deodorization tower (36) through a conduit (57) having a valve (58) and/or a conduit (59).

The deodorization tower comprises at least one first cell (60), at least one intermediate cell (61) and at least one final cell (62), each having at least one compartment containing at least one gas distributing means (63). The cell may be arranged vertically one over the other, as shown in FIG. 2, or may be arranged horizontally one next to the other. At least one means for conveying a portion of the deodorizing oil from one cell to another may be provided within the tower or outside the tower. At least one overflow pipe (64), for example, may be used inside the tower to convey a portion of the deodorizing oil in some of the cells or compartments thereof to their proceeding cells or compartments thereof while at least one conduit system (65) having a valve (66), for example, may be employed outside the tower to transfer a portion of the deodorizing or deodorized oil from one cell to another or to the discharging pipe (67).

The tower is operated at a temperature of about 150° C. to about 270° C. and a pressure of about 0.1 mmHg to about 6 mmHg to promote deodorization of the deaerated starting material which flows from at least one first cell to at least one final cell in the tower. A non-condensible inert stripping gas is introduced into the crude oil through the gas distributing means (63) in each cell, which communicates with the conduit (41) via conduits (68), (69) (70). The amount of the non-condensible gas entering the conduits (68), (69) and 70 may be monitored using flow indicators (71), (72) and (73) respectively and may be regulated by adjusting the opening sizes of orifices (74), (75) and (76) respectively to provide particular mounts of the non-condensible gas to at least one first cell, at least one intermediate cell and at least one final cell. Valves (not shown) may be implemented in lieu of or in addition to the orifices to provide a particular amount of the non-condensible inert gas to each cell. The particular amount of the non-condensible gas fed to each cell corresponds to the amount which is fed to each tray in the deodorization tower in FIG. 1. The largest portion of the non-condensible gas fed to the tower is delivered to at least one first cell which is in the vicinity of where the deaerated starting material is fed and the smallest portion of the non-condensible gas fed to the tower is delivered to at least one final cell which is in the vicinity of the deodorized product outlet.

During deodorization, the vapors containing, inter alia, the non-condensible gas, fatty acid and other odoriferous substances are formed. The vapors are withdrawn and may be directly delivered to condensers (77) and (78) using vacuum boosters (79 and 80) and steam-jet ejector (81) to recover condensates having fatty acid as previously indicated in the context of FIG. 1. Optionally, a scrubber system (82) may be employed to treat the vapors prior to delivering them to the first condenser (77) via the boosters (79 and 80) to recover fatty acids, thereby minimizing the contamination of motive steam employed in the boosters and ejector. The scrubber system (82) comprises a scrapper means (83) having a vapor upflow pipe (84) and a liquid downflow pipe (85), a pump means (86) for removing fatty acid condensate from the scrubber through a conduit (87), a cooling means for further cooling the condensate passing through conduit (87) to recycle the cooled condensate to the scrapper (83). The fatty acid containing condensate is usually recovered through a line (88). The amount of the condensate recovered in the line (88) is regulated by using a pump means (86) and a valve means (89). The valve means is usually adjusted based on the level of the condensate in the scrapper. Any uncondensed vapors are withdrawn from the scrubber (83) and then delivered to the condensers (77 and 78) via boosters (79 and 80) and ejector (81) to recover additional condensates as indicated above. The uncondensed vapors comprising non-condensible gas from the condenser (78) are removed to the atmosphere via a vacuum pump (100).

The following examples serve to illustrate the invention. They are presented for illustrative purposes and are not intended to be limiting.

EXAMPLE 1

A chemically refined sun flower oil was processed in the arrangement illustrated in FIG. 2. The sun flower oil was fed at about 500 tons/day in seriatim into a heat exchanger, a deaerator and a deodorization tower having a plurality of stages. Nitrogen, which was heated to about 112° C., was supplied at about 3 bar to the tower as a stripping gas, to the deaerator as a deaerating means and to the heat exchanger as an agitating and stabilizing means. The total nitrogen flow rate was about 40 $NM^3$/hr, which was equal to about 3.4 $NM^3$ of nitrogen per ton of untreated sun flower oil. The tower was operated at a pressure of about 1.3 bar and a temperature of about 230° C. to promote deodorization of sun flower oil. Once the sun flower oil was stripped of fatty acids, and volatile odoriferous and flavorous substances, it was cooled to below 100° C. by indirectly heat exchanging with the incoming untreated sun flower oil. During the indirect heat exchange, preheated nitrogen was supplied at about 3 bar into the discharged, hot deodorized sun flower oil to cause agitation, whereby the deodorized sun flower oil was, not only turbulently mixed, but also was saturated with nitrogen. The resulting cooled, stabilized sun flower oil was recovered. Subsequently the above process was repeated after replacing the preheated nitrogen with steam. Steam was injected at a rate of 15 kg/ton of untreated sun flower oil. Upon analyzing the sun flower oil treated with steam and nitrogen, it was found that the nitrogen treated sun flower oil imparts better quality and better peroxide index. Stability oil is also better than one treated with steam.

EXAMPLE 2

A physically refined olive oil was processed as shown in Example 1 except that nitrogen was injected at 40 $MN^3$/hr (3.5 $NM^3$/ton of oil) and the deodorization tower was operated at a pressure of about 1.6 m bar. The results were tabulated in the following Table I:

| TABLE I | |
|---|---|
| OLIVE OIL | |
| Peroxide value | 0.9 meq 02/Kg |
| Free fatty acid | 0.216 |
| $E^{1\%}_{1\,cm}$ at 232 nm (Primary oxidation) | 2.2 |
| $E^{1\%}_{1\,cm}$ at 268 nm (Secondary oxidation) | 0.5 |
| AOM (Stability test) | 56 hours |

As can be seen from the Table, the peroxide value was excellent. The free fatty acid content was high but this was expected for a start-up for a new batch when the system is not yet fully stabilized.

The analysis shown as $E^{1\%}{1cm}$ were readings taken from a spectrophotometer of light absorbed at the wavelengths quoted in a 1% solution of the oil in a spectropically pure solvent in a 1 cm cell. The wavelengths at 232 nm was related to the peroxide value which was indicative of primary oxidation and the wavelength at 268 nm was related to the Anisidine value which was indicative of secondary oxidation. The values of 2.2 and 0.5 respectively indicated a good stable oil.

Moreover, the AOM test indicated excellent product stability in comparison to conventional processes. AOM is an accelerated stability test at which an oil sample is exposed to heat under an oxidative environment. AOM value is the time (to the nearest hour) required for the sample to attain a peroxide value of 100 milliequivalents. In a conventional process, an AOM stability value of 10 hours is common for steam deodorized oil. As we can see from the above table, nitrogen injection into the heat recovery unit provided an exceptional product stability, i.e., an AOM stability value of 56 hours. Apparently, the dissolved nitrogen appears to protect the oil from oxidative degradation during storage.

Although the process of this invention has been described in detail with reference to certain embodiments, those skilled in the art will recognize that there are other embodiments of the invention within the spirit and scope of the Claims.

What is claimed is:

1. A process comprising: deodorizing crude oil in a deodorization tower in the presence of a stripping gas selected from the group consisting of steam and mixtures of steam and non-condensible inert gas to produce hot deodorized edible oil and sparging and dissolving non-condensible inert gas into said hot deodorized edible oil as said hot deodorized edible oil is cooled to less than about 100° C., wherein the amount of said non-condensible inert gas sparged is sufficient to promote uniform cooling and stability of the resulting, cooled deodorized edible oil.

2. The process as in claim 1, wherein at least about 1 scf of said non-condensible inert gas is sparged per ton of said deodorized edible oil.

3. The process as in claim 1, wherein said non-condensible inert gas is sparged at a velocity of at least 10 ft/sec.

4. The process as in claim 3, wherein said non-condensible inert gas is sparged at sonic velocity.

5. The process as in claim 1, wherein said non-condensible inert gas comprises nitrogen.

6. The process as in claim 5, wherein the non-condensible inert gas comprising nitrogen is preheated.

7. The process as in claim 1, wherein said hot deodorized oil is cooled in a heat recovery unit which employs crude oil to indirectly heat exchange with said hot deodorized oil, prior to subjecting said crude oil to deodorization.

8. The process as in claim 7, further comprising indirectly heat exchanging said crude oil with the deodorized edible oil from said heat recovery unit prior to its introduction into the heat recovery unit.

9. The process as in claim 1, wherein said hot deodorized edible oil is cooled to less than 60° C.

10. A process for cooling and stabilizing deodorized edible oils, which comprises:
    (a) sparging and dissolving non-condensible inert gas into hot deodorized edible oil as said hot deodorized edible oil is cooled to less than about 100° C., wherein the amount of said non-condensible inert gas sparged is sufficient to promote uniform cooling and stability of the resulting, cooled deodorized edible oil;
    (b) delivering the resulting cooled, deodorized edible oil containing non-condensible inert gas through a conduit into a storage container; and
    (c) sparging additional non-condensible inert gas in said conduit and/or said storage container so that said additional non-condensible inert gas is dissolved into said cooled, deodorized edible oil containing non-condensible inert gas.

* * * * *